United States Patent [19]

Ricciardi

[11] Patent Number: 5,301,844
[45] Date of Patent: Apr. 12, 1994

[54] DRY SOLIDS MATERIALS FEEDER WITH VIBRATING MECHANISM AND A METHOD OF VIBRATING VARIOUS COMPONENT PARTS OF THE FEEDER

[75] Inventor: Ronald J. Ricciardi, Woodcliff Lakes, N.J.

[73] Assignee: Acrison, Inc., Moonachie, N.J.

[21] Appl. No.: 994,168

[22] Filed: Dec. 21, 1992

Related U.S. Application Data

[63] Continuation of Ser. No. 716,284, Jun. 17, 1991, abandoned.

[51] Int. Cl.⁵ .............................................. B65G 65/46
[52] U.S. Cl. .............................. 222/199; 198/550.1; 222/233; 414/305; 414/326; 414/786
[58] Field of Search ............... 414/304, 305, 326, 786, 414/415, 525.7, 525.8; 222/199, 200, 233, 234; 198/533, 550.1, 548, 671

[56] References Cited

U.S. PATENT DOCUMENTS

| | | | |
|---|---|---|---|
| 2,792,030 | 5/1957 | Wahl | 222/200 X |
| 2,800,252 | 7/1957 | Wahl | 222/233 X |
| 2,858,011 | 10/1958 | Wahl | 198/671 X |
| 2,957,608 | 10/1960 | Wahl | 222/161 |
| 3,078,015 | 3/1960 | Wahl | 222/200 X |
| 3,079,050 | 3/1960 | Wahl | 222/334 |
| 3,151,782 | 10/1964 | Wahl | 222/202 |
| 3,173,583 | 5/1962 | Wahl | 222/199 |
| 3,203,599 | 8/1965 | Renner | 198/533 X |
| 3,257,040 | 6/1966 | Dumbaugh et al. | 222/161 |
| 3,261,508 | 1/1964 | Wahl | 222/199 |
| 3,278,090 | 3/1965 | Wahl | 222/199 |
| 3,297,203 | 1/1967 | Wahl | 222/47 |
| 3,297,304 | 2/1965 | Wahl | 366/109 |
| 3,411,675 | 11/1968 | Wahl | 222/238 |
| 3,552,545 | 1/1971 | Hartman | 198/533 |
| 3,601,369 | 8/1971 | Wahl | 366/114 |
| 3,773,231 | 11/1973 | Wahl | 222/199 X |
| 3,853,247 | 12/1974 | Wahl | 222/199 |
| 4,131,193 | 12/1978 | Musschoot | 198/533 |
| 4,546,872 | 10/1985 | Musschoot | 198/533 X |
| 4,821,782 | 4/1989 | Hyer | 198/533 X |
| 4,972,970 | 11/1990 | Toerner | 198/533 X |

*Primary Examiner*—David A. Bucci
*Attorney, Agent, or Firm*—Davis, Hoxie, Faithfull & Hapgood

[57] ABSTRACT

A volumetric dry solids materials feeder comprises a supply hopper, a feed trough disposed below the hopper, and an auger disposed in the feed trough to feed out the material. The trough is anchored to a vibration base, on which is mounted a vibratory mechanism. A vibration transfer spring connects the vibration base to a bracket secured to the hopper. Upon activation, the vibratory mechanism vibrates the vibration base and thus the trough at a predetermined frequency, while the spring transfers the vibration to the hopper. The spring lessens the amplitude of the transferred vibration and changes the frequency thereof, so as to minimize interference (primarily harmonic problems) between the vibration of the hopper and trough.

24 Claims, 2 Drawing Sheets

DRY SOLIDS MATERIALS FEEDER WITH VIBRATING MECHANISM AND A METHOD OF VIBRATING VARIOUS COMPONENT PARTS OF THE FEEDER

This is a continuation of Ser. No. 07/716,284, filed Jun. 17, 1991, now abandoned.

FIELD OF THE INVENTION

The present invention relates to the field of dry solids materials feeders, particularly to volumetric feeders that utilize vibration to assist in feeding the material uniformly and precisely, and a method of imparting vibration to such feeders.

BACKGROUND OF THE INVENTION

Volumetric dry solids materials feeders are designed to discharge material such as powders, granules, or stranded fiberglass at a predetermined rate based on volume. The material typically flows out of a hopper into a trough. Located in the trough is a discharge device, such as an auger, which feeds the material out of the trough through a discharge opening or spout. Such feeders, especially when feeding adhesive, cohesive, fibrous, or hygroscopic dry solids materials, sometimes experience problems in transferring the material from the hopper to the discharge device due to the material either sticking to the walls of the hopper, blocking downward flow, or bridging (compaction) of the material in the trough and/or hopper. Problems are also sometimes experienced in properly filling the feed auger with material.

It has been found that the above problems, among others, are reduced by the application of high-frequency vibration to the trough and hopper, particularly during handling of certain types of short fiberglass strands and other kinds of fibrous products. The high-frequency vibration shakes the material loose from the walls of the hopper, breaks-up bridging material, and greatly assists in filling the feed auger.

In addition to material-flow problems within the hopper or trough, the precise metering of material by a volumetric feeder can be disrupted, for example, when material of varying density enters the auger, when material sticks to the auger, or when difficulty is experienced in properly filling the auger. It has been found that vibration of the trough and auger also minimizes these problems. It is therefore desirable in many metering applications to vibrate both the hopper and the trough/auger.

Prior attempts at solving feeding problems through vibration include Wahl, U.S. Pat. No. 3,151,782, which discloses a volumetric materials feeder in which a single motor powers a metering auger and a vibratory mechanism. A first shaft of the vibratory mechanism imparts vibration to the trough and auger by rotation of an eccentric weight, and a second shaft, perpendicular to and directly connected by a belt/pulley system to the first shaft, vibrates the hopper. The frequency of hopper and trough vibrations will thus be equal, which, combined with the direct connection of the two vibration shafts, can sometimes cause problems of vibration interference (primarily harmonic problems).

Wahl, U.S. Pat. No. 3,297,203, discloses a vibratory tray volumetric feeder having a vibratory mechanism that vibrates both the tray and also an auxiliary hopper below the supply hopper. As in the Wahl '782 patent described above, the hopper and tray are both directly connected to the vibratory mechanism, with that configuration's attendant interference problems.

Wahl, U.S. Pat. No. 3,411,675, discloses a double auger volumetric feeder in which the trough and hopper are vibrated by means of a rotating cam repeatedly striking a protrusion connected to the support platform of the hopper and trough. Such a vibratory mechanism is subject to undue wear, along with the interference problems described above.

OBJECTS AND SUMMARY OF THE INVENTION

It is therefore an object of the present invention to overcome the disadvantages of prior art vibratory volumetric feeders.

It is a further object of the invention to provide an efficient vibratory mechanism for both the supply hopper and feed trough of a materials feeder.

It is a further object of the invention to provide a dry solids materials feeder with a vibratory mechanism that vibrates both the supply hopper and the feed trough, but in which the vibration interference of the hopper and trough is eliminated.

It is a further object of the invention to provide a common vibration source for the hopper and trough of a dry solids materials feeder which varies the amplitude and frequency of vibration between the hopper and trough.

In accordance with a first aspect of the invention, a dry solids materials feeder comprises supply means for supplying material, discharge means for receiving the material from the supply means and discharging the material from the feeder at a predetermined rate, and vibratory means for vibrating the discharge means at a first amplitude and a first frequency and for vibrating the supply means at a second amplitude and a second frequency.

In accordance with a further aspect of the invention, a volumetric dry materials feeder with a vibratory mechanism comprises a supply hopper for supplying material to be fed, a feed trough disposed beneath the supply hopper to receive the material from the supply hopper, a discharge device disposed in the feed trough for discharging the material from the feed trough, means for driving the discharge device, and an isolated vibration base to which the feed trough is secured. A vibratory mechanism is operatively connected to the vibration base and adapted to vibrate the vibration base, thereby vibrating the feed trough at approximately the same frequency and amplitude as the vibration base. A resilient member is connected to both the vibration base and to the supply hopper, whereby the vibration of the vibration base is transmitted by said resilient member to the supply hopper at a different frequency and amplitude than the vibration of the vibration base.

A further aspect of the invention is a method for vibrating a dry solids materials feeder comprising the steps of vibrating a discharge means at a first frequency and a first amplitude, and vibrating a supply hopper at a second frequency and a second amplitude.

Yet another aspect of the invention is a method of vibrating a dry solids materials feeder comprising the steps of transmitting a first vibration having a first frequency and a first amplitude from a vibration source to a discharge device, transmitting the first vibration from the vibration source to a vibration transfer device, changing the frequency and amplitude of the first vibration and thereby generating a second vibration having a second frequency and a second amplitude, and transmitting the second vibration from the vibration transfer device to a supply hopper.

Specifically, and in a preferred embodiment of the invention, a volumetric dry solid materials feeder comprises a supply hopper, a feed trough disposed beneath the supply hopper and connected to the supply hopper by a flexible sleeve whereby material flows from the supply hopper to the feed trough, a metering auger disposed at the bottom of the feed trough for precisely discharging material from the feed trough, and a drive motor operatively connected to the metering auger by a first drive shaft for driving the metering auger. A vibration base is securely attached to the feed trough. A radially unbalanced second drive shaft is rotatably mounted on the vibration base, and is adapted to vibrate the vibration base when the second drive shaft is rotated. A vibration transmitter, disposed between the vibration base and the supply hopper, changes the nature of vibration received from the vibration base and transmits the changed vibration to the supply hopper. A side support supports the supply hopper on a stationary base, with one or more vibration isolating means disposed between the supply hopper and the side support whereby the supply hopper is mounted on the side support. One or more vibration isolating means are disposed beneath the vibration base, whereby the vibration base is mounted on the stationary base.

BRIEF DESCRIPTION OF THE DRAWINGS

These and other objects, aspects, and embodiments of the present invention will be described with reference to the following drawing figures, of which.

DETAILED DESCRIPTION OF THE INVENTION

Figure 1:
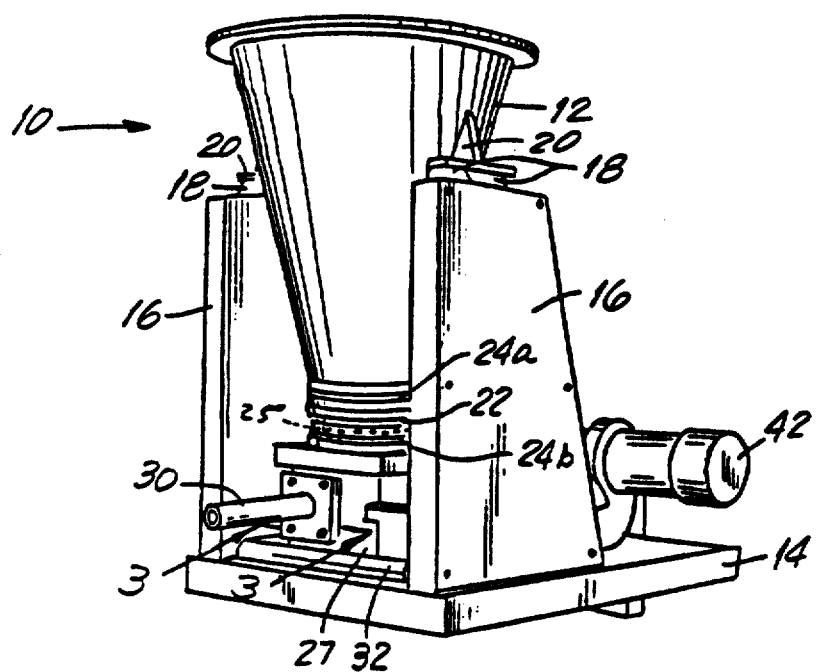
FIG. 1 is a perspective view of a preferred embodiment of a dry solids materials feeder according to the present invention.

Referring first to FIGS. 1 to 4, a preferred embodiment of a dry solids materials feeder 10 according to the invention is shown. The feeder 10 is used to feed dry solids materials at low to moderate feed rates typically ranging from 0.0009 to 100 cubic feet (or higher) per hour, depending on the size of auger used. As is known in the art, modifications to change the material feed-rate or type of material fed can be made, if desired. The term "dry solids" as used herein is intended to encompass both materials that have a high-moisture content and materials that have a low-moisture content.

A conical supply hopper 12 rests on a stationary base 14 by means of two side supports 16. The side supports 16 are welded or bolted to the stationary base 14. A pair of vibration isolators 18 is disposed between the top of each side support 16 and a bracket 20 protruding from the side of the hopper 12, to isolate the vibration of the hopper 12 from the base 14. The vibration isolators 18, and all other vibration isolators described herein, are preferably made of rubber or any other suitable isolating material. Bolts (not shown) run from the brackets 20 to the top of the side supports 16 into mounting pads of the vibration isolators 18 to secure the hopper 12 to the side supports 16. The hopper 12, supports 16, and base 14 are constructed of steel in the preferred embodiment.

Figure 3:
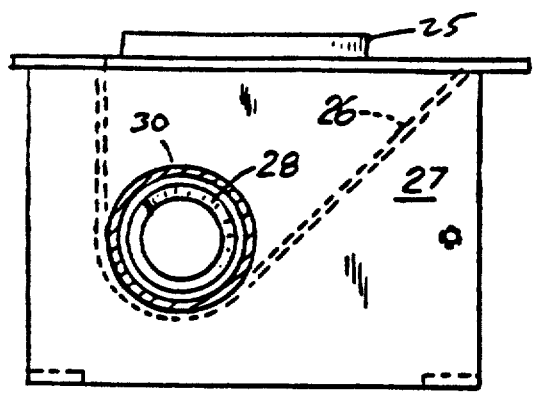
FIG. 3 is a partial front elevational view along line 3—3 of FIG. 1, showing the feed trough and discharge device.

A flexible sleeve 22, constructed in the preferred embodiment of synthetic cloth, is attached at its upper end to the bottom of the hopper 12 by a metal clamp 24a, and at its lower end to a circular opening 25 protruding from a V-shaped feed trough 26 (FIG. 3) by a second metal clamp 24b. The hopper 12 provides material through the flexible sleeve 22 to the feed trough 26 while preventing material dust from leaving the feeder 10. A trough casing 27 surrounds and supports the feed trough 26. A metering auger 28 is disposed in the feed trough 26 and continues through the length of a discharge cylinder 30 attached to the front of the trough casing 27. The rotation of the auger 28 feeds the material through and out of the discharge cylinder 30. As shown in FIG. 3, the auger 28 is disposed at the bottom of the feed trough 26 in the preferred embodiment in order to feed all the material out of the feed trough 26, even when the latter is partially empty. The trough 26, trough casing 27, auger 28, and discharge cylinder 30 are constructed of steel in the preferred embodiment. In the preferred embodiment, the trough 26 is an offset V-shaped trough such as the trough used with model number V101 feeders available from Acrison, Inc., the assignee of the present application.

The trough casing 27 is welded or otherwise secured to a vibration base 32 disposed directly beneath it. As discussed below, the vibration base 32 is vibrated, and imparts that vibration to the feed trough 26 and auger 28 through the trough casing 27. The vibration base 32 is mounted to the stationary base 14 by means of vibration isolators 34, which isolate the stationary base 14 from the vibration of the vibration base 32. A vibration transfer spring 36 or other suitable vibration transfer means is welded or otherwise securely attached at its lower end 36a to the vibration base 32, and at its upper end 36b to a vibration transfer bracket 38. The transfer bracket 38 is welded or otherwise securely attached to the hopper 12. A seal assembly 40 is disposed behind the trough casing 27 to accommodate the entrance of a drive shaft 48 (described below) into the trough casing 27.

The vibration transfer spring 36 and bracket 38 impart vibration to the supply hopper 12 from the vibration base 32. This vibration aids in product flow out of the hopper 12 by shaking off any material sticking to the walls of the hopper 12, and by loosening any unduly compacted or bridged material. The spring 36 will absorb some of the vibration received from the base 32, causing the amplitude of vibration of the hopper 12 to be less than that of the base 32. The capacity rating of the spring 36 determines the amount of vibration absorbed; the higher the capacity rating, the less vibration will be absorbed, and consequently, the greater will be the amplitude of vibration of the hopper 12. The spring 36 also causes the frequency of vibration of the hopper 12 to be different from that of the base 32. A spring has a natural frequency of vibration with any given weight load and will tend toward that natural frequency; thus the spring 36 tends toward its natural frequency of vibration even while being vibrated by the vibration base 32, thereby changing the frequency of vibration that is transferred to the hopper 12 from the vibration base 32. Any interference between the vibration of the hopper 12 and the feed trough 26, especially harmonic problems, is therefore minimized resulting in improved material flow and a higher degree of metering performance.

Figure 4:
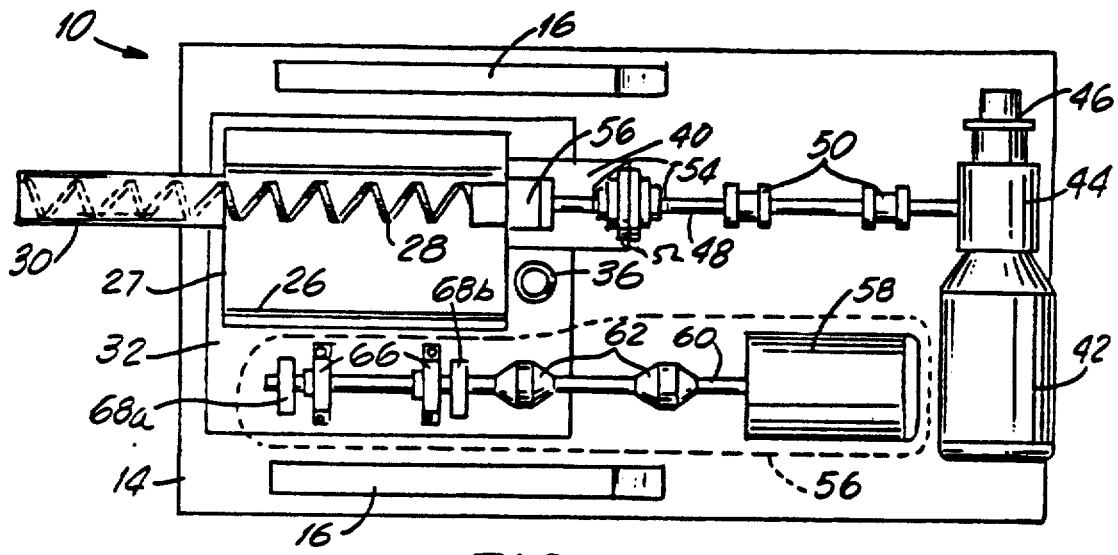
FIG. 4 is a view along line 4—4 of FIG. 2, being a top plan view in cross section of the materials feeder of FIG. 1.

As shown most clearly in FIG. 4, the auger 28 is powered by a motor 42, which in the embodiment shown is a fractional horsepower variable speed DC motor controlled by an SCR/DC controller (not shown). The controller may be any one of various commercially available controllers such as those sold by Acrison, Inc. In the preferred embodiment, a gear reducer 44 is mounted adjacent to the motor 42, and a tachometer 46 may be mounted adjacent to the gear reducer 44. A steel drive shaft 48, containing drive couplings 50, connects the gear reducer 44 to the metering auger 28 through the seal assembly 40. The couplings 50, constructed primarily of rubber or other suitable material, isolate the gear-reducer 44 and the motor 42 from the vibration of the auger 28 and feed trough 26. Bearings 52 are disposed at the point where the drive shaft 48 enters the seal assembly 40, and are kept in place by snap ring retainers 54. A sub-seal assembly 56 is disposed in the seal assembly 40 at the entrance of the drive shaft 48 to the trough 26.

Figure 2:
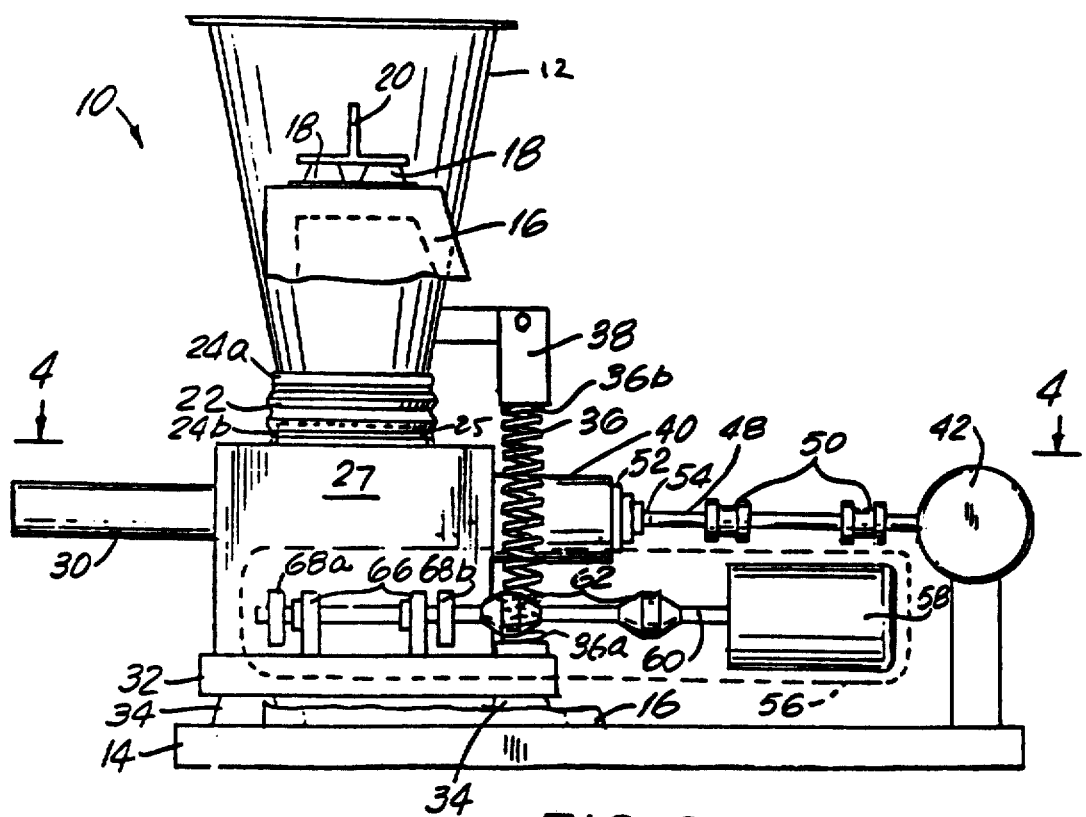
FIG. 2 is a side elevational view of the materials feeder of FIG. 1, with the side support partially cut away.

As shown in FIGS. 2 and 4, a preferred example of a vibratory mechanism 56, used with the materials feeder 10 of FIG. 1 in the preferred embodiment, is indicated by a dotted enclosure. A motor 58 powers the vibratory mechanism 56 through a drive shaft 60, on which is mounted a pair of isolation couplings 62. In the embodiment shown, the motor 58 is a fractional horsepower constant speed AC motor. The speed of the motor 58 determines the frequency of vibration of the vibratory mechanism 56. The couplings 62, of similar construction to the couplings 50, isolate the motor 58 from the vibration produced by the rest of the vibratory mechanism 56. The end of the drive shaft 60 opposite the motor 58 is journaled in two brackets or mounts 66, which mount the vibratory mechanism 56 to the vibration base 32. Two identical eccentric weights 68a and 68b are secured to the drive shaft 60 adjacent each mount 66. An "eccentric weight" as used herein means a weight which is attached to an axis of rotation (the drive shaft 60) at a point other than the weight's center of mass, causing the axis of rotation to be radially unbalanced.

One of the eccentric weights 68a, b, weight 68a in the embodiment shown, is welded or otherwise secured to the drive shaft 60. The other weight, 68b in the embodiment shown, is secured to the drive shaft 60 such that it can be loosened and rotated to a different position, e.g., by means of a socket-head cap screw. (Though it is unnecessary, the other weight 68a may also be made adjustable if desired.) The rotation of the weights 68a, b while being driven by the drive shaft 60 causes the latter to vibrate since, unless the weights 68a, b are 180 degrees out of phase (as discussed below), the off-center mounting of the weights 68a, b causes the drive shaft 60 to be out of balance. The vibration of the shaft 60 is transferred to the vibration base 32 through the mounts 66, causing the base 32 to vibrate as well.

The amplitude of vibration produced by the eccentric weights 68a, b depends in part on the position of each eccentric weight with respect to one another. When the weights 68a, b are 180 degrees out of phase, there is very little vibration owing to the radially balanced distribution of weight on the drive shaft 60. To be 180 degrees out of phase means that the weight 68b is positioned so that its weight distribution is exactly radially opposite to the weight distribution of the weight 68a, causing the combination of weight to be radially balanced on the shaft 60. When the weights 68a, b are aligned, i.e., in phase, the amplitude of vibration is greatest, since the drive shaft 60 is at its most unbalanced position at that point. The amplitude of vibration therefore decreases as the weights 68a, b are placed further out of phase.

The position of the weights 68a, b is adjusted, as mentioned above, typically by loosening a cap screw on weight 68b, rotating it to the desired position, and re-tightening the cap screw. In practice, the appropriate amplitude of vibration is determined empirically by determining the point of adjustment at which the combination of metering accuracy and materials flow is at an optimum. The amplitude of vibration also varies in direct proportion to the weight of the eccentric weights 68a, b. If only one amplitude of vibration is needed, the eccentric weights 68a, b may be made integral with the drive shaft 60, if desired.

Figure 5:
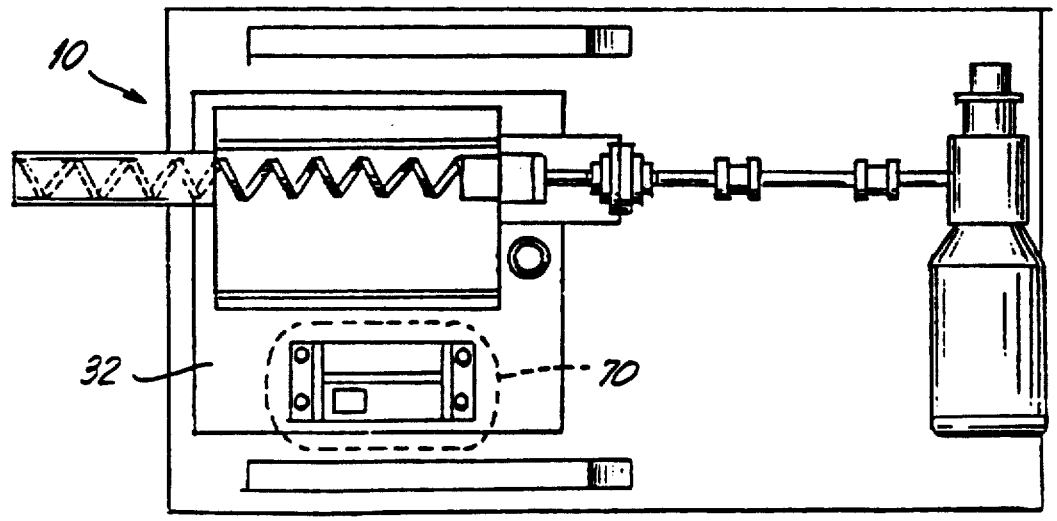
FIG. 5 is a top plan view in cross section of another embodiment of a materials feeder that employs a self-contained vibratory mechanism.

Referring now to FIG. 5, another embodiment of a feeder 10 is shown using a vibratory mechanism 70 instead of the vibratory mechanism 56 shown in FIGS. 2 and 4. The vibratory mechanism 70 is self-contained, and need only be secured to the vibration base 32 by any suitable means to vibrate the latter. An example of a commercially available self-contained vibratory mechanism is the 2P-100 model made by VIBCO, Inc., Wyoming, R.I. In FIG. 5, all components are identical to the components shown in FIG. 4 except for the vibratory mechanism 70.

In many applications, the vibratory mechanism 56 shown in FIGS. 2 and 4 is preferable over the vibratory mechanism 70 shown in FIG. 5. Typically, self-contained vibrators such as the mechanism 70 are able to be adjusted to only three or four different amplitudes, in contrast to the infinite adjustment possible with the vibratory mechanism 56. A self-contained vibrator such as the mechanism 70, however, usually costs less than the mechanism 56.

In operation of the feeder 10, the hopper 12 is filled with material, the hopper 12 supplies the material to the feed trough 26, and the drive motor 42 is activated to move the auger 28 at a predetermined rotational speed, which causes the auger 28 to displace a corresponding predetermined volume per revolution and/or per unit of time, all of which is conventional in the operation of volumetric feeders. Optionally, the controller may be made to control the speed of the drive motor 42 and keep it constant based on the tachometer signal, in the following way: if the tachometer 46 indicates that the motor 42 is operating at less than the desired speed, the controller transmits an appropriate signal to the motor 42 resulting in an increase in motor speed; if the tachometer 46 indicates that the motor 42 is operating at more than the desired speed, the controller transmits an appropriate signal to the motor 42 resulting in a decrease in motor speed.

If the vibratory mechanism 56 of FIGS. 2 and 4 is used in the operation of the feeder 10, the motor 58 is activated, causing the eccentric weights 68a, b to rotate on the drive shaft 60 and vibrate the vibration base 32. Since the feed trough casing 27 is mounted on the vibration base 32, the shaft 60 is rotatably attached to the trough casing. If the vibratory mechanism 70 of FIG. 5 is used, the mechanism 70 is simply turned on to vibrate the base 32.

The vibration of the base 32 causes the feed trough casing 27 to vibrate, which in turn causes the feed trough 26 and auger 28 to vibrate. The base 32 also causes the supply hopper 12 to vibrate through the connection of the spring 36 and bracket 38. The shaft 60 is thus rotatably and resiliently attached to the supply hopper 12. The spring 36 will alter the amplitude and frequency of vibration transferred to the hopper 12, as described above, minimizing the interference between the vibration of the hopper 12 and the feed trough 26 given that the hopper 12 is vibrating at both a different amplitude and a different frequency than the feed trough 26.

The feeder 10 thus uniformly supplies material to the feed trough 26 from the hopper 12 and precisely discharges material from the trough 26 out of the discharge cylinder 30 by means of the metering auger 28, by vibrating the hopper 12 and feed trough 26 and metering auger 28. The vibration is carried out efficiently, since there is relatively little interference between the vibration of the hopper 12 and the trough 26 and auger 28 even though the vibration originates at a common source.

The foregoing description is not meant to limit the invention to the specific embodiments described. Other embodiments and variations of the invention will be apparent to those skilled in the art, including those in which modifications are made in order to feed different materials, change the capacity of the feeder 10, change the means of vibration of the base 32, or change the spring 36 to another type of vibration transfer member or other suitable device. It will be appreciated by those skilled in the art that the vibration of the vibratory mechanism 56 or 70 can be altered during transmission to the feed trough 26 and auger 28 while remaining unchanged during transmission to the hopper 12, instead of the other way around as has been described, while remaining within the scope of the invention. The vibration mechanism 56 or 70 can be designed to directly vibrate the hopper 12 and vibrate the trough 26 and auger 28 through the spring 36, such that the spring alters the frequency and amplitude of vibration. The invention is defined by the following claims:

What is claimed is:

1. A materials feeder comprising:
   supply means for supplying material;
   discharge means for receiving said material from said supply means and for discharging said material from said feeder at a predetermined rate;
   a single vibratory means for vibrating said discharge means at a first amplitude and a first frequency;
   a first vibration transfer means operatively connected between said discharge means and said supply means for transferring the vibration of said vibratory means to said supply means at a changed amplitude and a changed frequency; and
   a stationary base having a first vibration isolator upon which the supply means is mounted and a second vibration isolator upon which the discharge means is mounted.

2. The materials feeder of claim 1, wherein said supply means comprises a hopper and wherein said discharge means comprises a feed trough and an auger disposed therein, and wherein the stationary base includes a side support on which the first vibration isolator is disposed.

3. The materials feeder of claim 1, wherein said vibratory means comprises a radially unbalanced rotatably shaft rotatably attached to said discharge means and rotatably and resiliently attached to said supply means.

4. A volumetric dry solids materials feeder comprising:
   a supply hopper for supplying material to be fed;
   a feed trough disposed beneath said supply hopper to receive said material from said supply hopper;
   a discharge device disposed in said feed trough for discharging said material from said feed trough;
   means for driving said discharge device;
   a vibration base to which said feed trough is secured;
   a vibratory mechanism operatively connected to said vibration base for vibrating said vibration base, thereby vibrating said feed trough at approximately the same frequency and amplitude as said vibration base;
   a resilient member connected to both said vibration base and to said supply hopper, whereby the vibration of said vibration base is transmitted by said resilient member to said supply hopper at a different frequency and amplitude than the vibration of said vibration base; and
   a stationary base including a side support having a first vibration isolator disposed thereon, upon which is mounted said hopper, and wherein said stationary base has a second isolator disposed thereon, upon which is mounted said feed trough.

5. The volumetric dry solids materials feeder of claim 4, wherein said resilient member is a spring.

6. The volumetric dry solids materials feeder of claim 4, wherein said vibratory mechanism comprises a motor, a drive shaft attached to said motor for rotation therewith, a bracket rotatably mounting said drive shaft to said vibration base, and an eccentric weight attached to said drive shaft, causing said drive shaft to be out of balance, such that said eccentric weight causes said drive shaft to vibrate and transfer said vibration to said vibration base when said drive shaft is rotated by said motor.

7. The volumetric dry solids materials feeder of claim 4, wherein said vibratory mechanism comprises a motor, a drive shaft attached to said motor for rotation therewith, a bracket rotatably mounting said drive shaft to said vibration base, and a plurality of rotatably adjustable eccentric weights disposed on said drive shaft, such that the amplitude of vibration of said drive shaft may be adjusted by rotating one or more of said eccentric weights on said drive shaft.

8. The volumetric dry solids materials feeder of claim 4, wherein said vibratory mechanism comprises a self-contained vibration unit attached to said vibration base.

9. A volumetric dry solids materials feeder mechanism, comprising:
   a base;
   a trough and auger discharge assembly for discharging a material from said feeder at a predetermined rate which discharge assembly is mounted to the base by a first vibration isolator;
   a supply source of material for said trough and auger discharge assembly which supply source is mounted to the base by a second vibration isolator;
   vibration means for producing vibration;

transfer means for transferring vibration from said vibration means to said trough and auger discharge assembly; and resilient means operatively attached at a first end to said vibration means end at a second end to said supply source, for receiving vibration from said vibration means and for changing the frequency and amplitude of said vibration and for transferring said changed vibration to said supply source.

10. The volumetric dry solids materials feeder of claim 9, wherein said resilient means comprises a spring.

11. The volumetric dry solids materials feeder mechanism of claim 9 further comprising an isolation base wherein said trough and auger discharge assembly and said supply source are mounted on the isolation base such that the vibration of said trough and auger discharge assembly and the vibration of said supply source are isolated from the isolation base.

12. A volumetric dry solids materials feeder, comprising:
a supply hopper;
a feed trough disposed beneath said supply hopper and connected to said supply hopper by a flexible sleeve whereby material flows from said supply hopper to said feed trough;
a metering auger disposed at the bottom of said feed trough for precisely discharging material from said feed trough;
a drive motor operatively connected to said metering auger by a first drive shaft, for driving said metering auger;
a vibration base securely attached to said feed trough;
a radially unbalanced second drive shaft rotatably mounted on said vibration base, adapted to vibrate said vibration base when said second drive shaft is rotated;
a vibration transmitter disposed between said vibration base and said supply hopper for changing the nature of vibration received from said vibration base and transmitting said changed vibration to said supply hopper;
a side support supporting said supply hopper on a stationary base;
first vibration isolating means disposed between said supply hopper and said side support for isolating vibration, whereby said supply hopper is mounted on said side support; and
second vibration isolating means disposed beneath said vibration base for isolating vibration, whereby said vibration base is mounted on said stationary base.

13. The volumetric dry solid materials feeder of claim 12, wherein said first vibration isolating means comprises a plurality of vibration isolators, and wherein said second vibration isolating means also comprising a plurality of vibration isolators.

14. The volumetric dry solids materials feeder of claim 12, wherein said vibration transmitter comprises a spring.

15. A method of vibrating a dry solids materials feeder that comprises a supply hopper, discharge means disposed beneath said supply hopper, a base, and a vibration source, the method comprising the steps of:
vibrating said discharge means at a first frequency and amplitude;
transferring the first frequency and the first amplitude from the discharge means to the supply hopper;
vibrating said supply hopper at a second frequency and a second amplitude;
wherein the first frequency and the first amplitude are different from the second frequency and the second amplitude, respectively;
isolating the vibration of the discharge means from the base; and
isolating the vibration of the supply hopper from said base.

16. A method of vibrating a dry solids materials feeder that comprises a supply hopper, discharge device, a base, a single vibration source, and vibration transfer device, the method comprising the steps of:
transmitting a first vibration having a first frequency and a first amplitude from said vibration source to said discharge device;
isolating the vibration of said discharge device from said base;
transmitting said first vibration from said single vibration source to said vibration transfer device;
changing the frequency and amplitude of said first vibration, thereby generating a second vibration having second frequency and a second amplitude;
transmitting said second vibration from said vibration transfer device to said supply hopper; and
isolating the vibration of said supply hopper from said base.

17. The method of vibrating a dry solids materials feeder of claim 16, wherein the step of changing said first vibration to said second vibration includes the step of causing said vibration transfer device to absorb a portion of the amplitude of said first vibration.

18. The method of vibrating a dry solids materials feeder of claim 16, wherein the step of changing said first vibration to said second vibration includes the step of interposing the natural vibration frequency of said vibration transfer device into said first frequency.

19. A materials feeder comprising:
supply means for supplying material;
discharge means for receiving said material from said supply means and for discharging said material from said feeder at a predetermined rate; and
vibratory means for vibrating said discharge means at a first amplitude and a first frequency, and for vibrating said supply means at a second amplitude and a second frequency;
wherein said supply means comprises a hopper and wherein said discharge means comprises a feed trough and an auger disposed therein, and further comprising a stationary base including a side support having a first vibration isolator disposed thereon, upon which is mounted said hopper, and wherein said stationary base has a second vibration isolator disposed thereon, upon which is mounted said feed trough.

20. The materials feeder of claim 19 further comprising a resilient means mounted at a first end to said discharge means and mounted at a second end to said supply means.

21. A method of operating a dry solids materials feeder that comprises a supply hopper and a discharge means mounted on an isolation base, and a vibration source, the method comprising the steps of:
vibrating said discharge means at a first frequency and a first amplitude;
isolating the vibration of said discharge means from said base;

vibrating said supply hopper at a second frequency and a second amplitude; and isolating the vibration of said supply hopper from said base.

22. The method of claim 21 further comprising the steps of loading material into the supply hopper, transferring material from the supply hopper to the discharge means, and feeding material from the discharge means at a controlled rate.

23. The method of claim 22 wherein the step of feeding material from the discharge means comprises rotating an auger within a trough.

24. The method of claim 21 further comprising the step of transferring the vibration of said discharge means through a resilient means to said supply hopper.

* * * * *

UNITED STATES PATENT AND TRADEMARK OFFICE
CERTIFICATE OF CORRECTION

PATENT NO. : 5,301,844
DATED : April 12, 1994
INVENTOR(S) : Ronald J. Ricciardi

It is certified that error appears in the above-indentified patent and that said Letters Patent is hereby corrected as shown below:

Column 8, line 4, replace "rotatably" with —rotatable—.

Column 9, line 56, replace "comprising" with —comprises—.

Signed and Sealed this

Thirteenth Day of September, 1994

Attest:

BRUCE LEHMAN

Attesting Officer      Commissioner of Patents and Trademarks